US011869484B2

(12) United States Patent
Lu et al.

(10) Patent No.: US 11,869,484 B2
(45) Date of Patent: Jan. 9, 2024

(54) APPARATUS AND METHOD FOR AUTOMATIC GENERATION AND UPDATE OF KNOWLEDGE GRAPH FROM MULTI-MODAL SOURCES

(71) Applicant: Hong Kong Applied Science and Technology Research Institute Company Limited, Hong Kong (HK)

(72) Inventors: Yunzhao Lu, Hong Kong (HK); Wai On Sam Lam, Hong Kong (HK); Man Choi Asa Chan, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 314 days.

(21) Appl. No.: 17/458,545

(22) Filed: Aug. 27, 2021

(65) Prior Publication Data

US 2023/0065468 A1 Mar. 2, 2023

(51) Int. Cl.
*G10L 15/06* (2013.01)
*G10L 15/26* (2006.01)
(Continued)

(52) U.S. Cl.
CPC ............ *G10L 15/063* (2013.01); *G10L 15/02* (2013.01); *G10L 15/1822* (2013.01);
(Continued)

(58) Field of Classification Search
CPC ... G10L 15/063; G10L 15/02; G10L 15/1822; G10L 15/26; G10L 17/22;
(Continued)

(56) References Cited

U.S. PATENT DOCUMENTS 11,451,666 B1* 9/2022 Biswas .................. G06F 40/35
11,558,509 B1* 1/2023 Jayapalan ........... H04M 3/5175
(Continued)

FOREIGN PATENT DOCUMENTS

CN 108875051 A 11/2018
CN 109918489 A 6/2019
(Continued)

OTHER PUBLICATIONS

Kejriwal, Mayank. Domain-specific knowledge graph construction. Cham: Springer International Publishing, 2019. (Year: 2019).*
(Continued)

*Primary Examiner* — Douglas Godbold
(74) *Attorney, Agent, or Firm* — Idea Intellectual Limited; Margaret A. Burke; Sam T. Yip (57) ABSTRACT

The present invention provides an apparatus and method for automatic generation and update of a knowledge graph from multi-modal sources. The apparatus comprises a conversation parsing module configured for updating a dynamic information word set $V_D$ with labelled words generated from extracted from the multi-modal sources; updating a static information word set $V_S$ based on extracted schema of relations extracted from the multi-modal sources; and generating pairs of question and answer based on the dynamic information word set $V_D$, the static information word set $V_S$ and the one or more sentence patterns; and a knowledge graph container configured for updating a knowledge graph based on the extracted entities of interest and schema of relations. Therefore, an efficient and cost-effective way for question decomposition, query chain construction and entity association from unstructured data is achieved.

20 Claims, 9 Drawing Sheets

(51) Int. Cl.
　　　*G10L 15/02*　　　(2006.01)
　　　*G10L 17/22*　　　(2013.01)
　　　*G10L 15/18*　　　(2013.01)
(52) U.S. Cl.
　　　CPC .............. *G10L 15/26* (2013.01); *G10L 17/22* (2013.01); *G10L 2015/0631* (2013.01)
(58) Field of Classification Search
　　　CPC ............. G10L 2015/0631; G10L 17/00; G06F 40/279; G06F 40/30
　　　See application file for complete search history.

(56) References Cited

U.S. PATENT DOCUMENTS

| | | |
|---|---|---|
| 2004/0083092 A1 | 4/2004 | Valles |
| 2014/0280307 A1 | 9/2014 | Gupta et al. |
| 2015/0066502 A1* | 3/2015 | Achituv .................. G10L 15/01 704/235 |
| 2018/0113854 A1 | 4/2018 | Vig et al. |
| 2020/0342860 A1* | 10/2020 | Ju .......................... G10L 21/028 |
| 2022/0164683 A1* | 5/2022 | Hao ........................ G06F 16/35 |
| 2022/0321511 A1* | 10/2022 | Hansmann ............ H04L 51/046 |
| 2022/0351716 A1* | 11/2022 | Kim ........................ G10L 25/30 |

FOREIGN PATENT DOCUMENTS

| | | |
|---|---|---|
| CN | 111339313 A | 6/2020 |
| CN | 112002411 A | 11/2020 |
| CN | 112084312 A | 12/2020 |
| WO | 2021030915 A1 | 2/2021 |

OTHER PUBLICATIONS

International Search Report and Written Opinion of corresponding PCT Patent Application No. PCT/CN2021/115871 dated May 25, 2022.

* cited by examiner

- while $V_D \neq \emptyset$ do
  - $V \leftarrow POP(V_D)$
  - while cursor $\leftarrow V$ do
    - $KG \cup= cursor \rightarrow entity$
    - $cursor \leftarrow cursor \rightarrow next$
  - end while
- end while
- $E_C \leftarrow EntityClassification(V_D, V_S)$
- while $E_C \neq \emptyset$ do
  - $S \leftarrow POP(E_C); L_C = \emptyset$
  - for each $K \in KG$ do
    - $\gamma_l = foo\ (\lambda \cdot S + \eta \cdot K + \varphi \cdot t_\lambda)$
    - $L_C \cup= K$
    - if $|L_C| > L_{max}$ then
      - RemoveWorst($L_C, \gamma_l$)
    - endif
  - end for
  - $KG \cup= Best(L_C, \gamma_l)$
- end while

APPARATUS AND METHOD FOR AUTOMATIC GENERATION AND UPDATE OF KNOWLEDGE GRAPH FROM MULTI-MODAL SOURCES

FIELD OF THE INVENTION

The present invention relates generally to methods and apparatuses for generation and update of knowledge graphs, particularly generation of knowledge graphs from multi-modal sources.

BACKGROUND OF THE INVENTION

Knowledge graph represents a collection of interlinked descriptions of entities such as words, phrases, metadata, knowledge patterns and even question and answer via linking and semantic metadata. By this way, knowledge graph can provide a framework for data integration, unification, analysis and sharing.

Knowledge graph has been proposed to be used as a key in knowledge engine and search engine for mapping the syntax of a complex natural language request into meanings and ultimately, mapping those meanings to computer applications that already run transactions and queries in an information system. Knowledge graph has also become an important tool for knowledge transformation and representation, and an important means for information mining, semantic analysis, knowledge generation and knowledge reasoning.

The rapid development of machine learning provides some feasibility for automation of the construction and expansion of knowledge graph. For example, machine learning has been used in question decomposition, query chain construction and entity association from unstructured data.

However, for some information query applications such as chatbots, knowledge graphs are constructed with questions and answers prepared by experienced engineers. Questions and answers are manually labelled out from multi-modal data and filled into various templates with a variety of queries and levels of hierarchy before being uploaded to knowledge base. The multi-modal data may include massive historical data such as instruction manuals and recordings of customer service conversations. Search of meaningful schema data and extraction of useful questions and answers from the massive historical data could be tedious and inefficient.

SUMMARY OF THE INVENTION

In addressing the aforesaid challenges in the current state of the art, the present invention provides an apparatus and method for automatic generation and update of a knowledge graph from multi-modal sources. It is also an objective of the present invention to provide such apparatus and method that do not require manually extracting information of interest from multi-modal sources for generating questions and answers. Therefore, an efficient and cost-effective way for question decomposition, query chain construction and entity association from unstructured data is achieved.

In accordance with one aspect of the present invention, the present invention provides an apparatus and method for automatic generation and update of a knowledge graph from multi-modal sources. The apparatus comprises a speaker diarization module configured for: partitioning an input audio stream into audio segments; classifying speakers of the audio segments as agent or customer; and clustering the audio segments based on speaker classification; an audio transcription module configured for transcribing the clustered audio segments to transcripts based on an acoustic model; a speech parsing module configured for: extracting entities of interest and schema of relations from the transcripts; and labelling words of the transcripts corresponding to the extracted entities of interest with a plurality of pre-defined tags from a domain-specific language model; a conversation parsing module configured for updating a dynamic information word set VD with labelled words generated from extracted from the multi-modal sources; updating a static information word set VS based on extracted schema of relations extracted from the multi-modal sources; retrieving one or more sentence patterns from the domain-specific language model; and generating pairs of question and answer based on the dynamic information word set VD, the static information word set VS and the one or more sentence patterns; and a knowledge graph container configured for updating a knowledge graph by: receiving the extracted entities of interest and schema of relations; representing the extracted entities of interest as nodes in the knowledge graph; and representing the extracted schema of relations as labels and edges between nodes in the knowledge graph.

The present invention provides an efficient and cost-effective way for question decomposition, query chain construction and entity association from unstructured data is achieved.

BRIEF DESCRIPTION OF THE DRAWINGS

Embodiments of the invention are described in more detail hereinafter with reference to the drawings, in which.

DETAILED DESCRIPTION

In the following description, apparatuses and methods for automatic generation and update of a knowledge graph from multi-modal sources, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
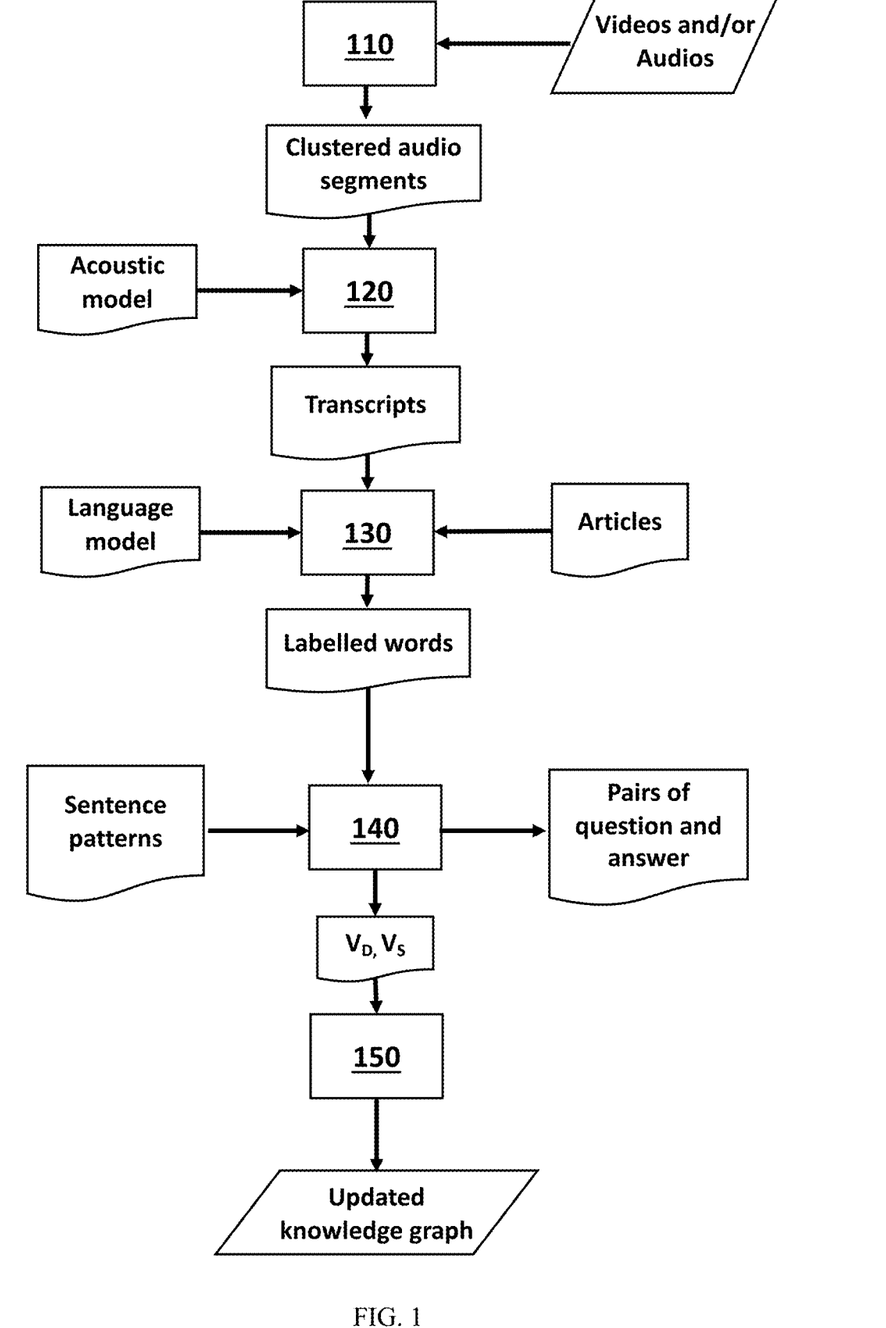
FIG. 1 shows a block diagram of an apparatus for automatic generation and update of a knowledge graph from multi-modal sources according to one embodiment of the present invention.

FIG. 1 shows a block diagram of an apparatus for automatic generation and update of a knowledge graph from multi-modal sources according to one embodiment of the present invention. Referring to FIG. 1, the apparatus comprises a speaker diarization module 110, an audio transcription module 120, a speech parsing module 130; a conversation parsing module 140 and a knowledge graph container 150.

Figure 2:
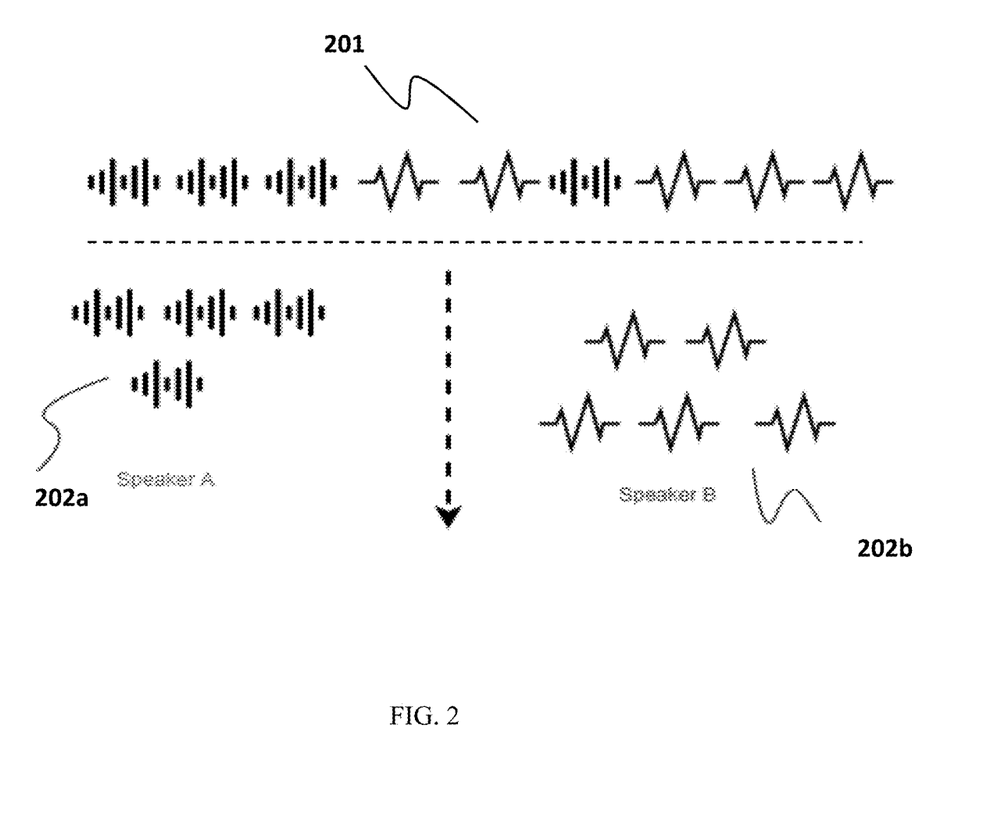
FIG. 2 shows a working mechanism for a speaker diarization module according to one embodiment of the present invention.

FIG. 2 shows a working mechanism for the speaker diarization module 110. Referring to FIGS. 1 and 2, the speaker diarization module 110 may be configured for partitioning an input audio stream 201 into audio segments; classifying speakers of the audio segments as audio segments 202a from a speaker A (e.g. agent) or audio segments 202b from a speaker B (e.g. customer); and clustering the audio segments 202a and 202b based on speaker classification. In some embodiments, the input audio stream 201 may be a soundtrack of a video or audio stream.

Referring back to FIG. 1, the audio transcription module 120 may be configured for: receiving the clustered audio segments from the speaker diarization module 110; and transcribing the clustered audio segments to transcripts based on an acoustic model.

The speech parsing module 130 may be configured for: receiving the transcripts from the audio transcription module 120; extracting entities of interest and schema of relations from the received transcripts; and labelling words of the transcripts corresponding to the extracted entities of interest with a plurality of pre-defined tags from a domain-specific language model.

Preferably, the speech parsing module 130 is further configured for receiving an article; extracting entities of interest and schema of relations from the article; and labelling words of the article corresponding to the extracted entities of interest with a plurality of pre-defined tags from a domain-specific language model. The conversation parsing module 140 may be further configured for receiving the labelled words of the article; updating the dynamic information word set $V_D$ with the labelled words of the article; and updating the static information word set $V_S$ based on the extracted schema of relations from the article.

In some embodiments, the domain-specific language model may be generated by generalizing a table of jargons and corpus with vocabulary lexicon to form a general language model; and interpolating the general language model with pre-defined domain-specific knowledge based on a heuristic weighting to generate the domain-specific language model.

The conversation parsing module 140 may be configured for receiving the labelled words of the transcripts; updating a dynamic information word set $V_D$ with the labelled words of the transcripts; updating a static information word set $V_S$ based on the extracted schema of relations from the transcripts; retrieving one or more sentence patterns from the domain-specific language model; and generating pairs of question and answer based on the dynamic information word set $V_D$, the static information word set $V_S$ and the one or more sentence patterns.

Figure 3:
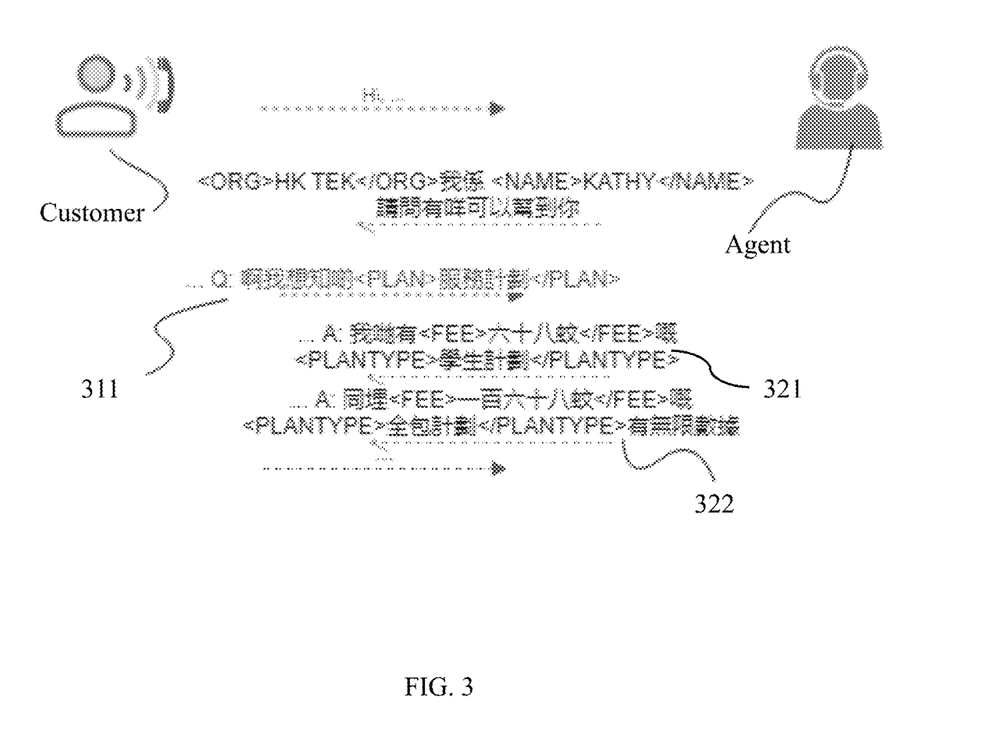
FIG. 3 shows how transcripts are processed by a conversation parsing module according to one embodiment of the present invention.

FIG. 3 shows how transcripts are processed by the conversation parsing module 140 according to one embodiment of the present invention. Referring to FIG. 3, the transcripts are labelled by the conversation parsing module 140 with pre-defined tags (e.g. <ORG>, <NAME>, <PLAN>, <FEE>, <PLANTYPE>). The words labelled with the pre-defined tags are then used to update the dynamic information word set $V_D$. As the speakers for the transcripts have been classified as Agent and Customer, pairs of question and answer can then be extracted from the transcripts based on the speaker classification. For example, Question 311 is extracted from a transcript from speaker Customer, Answer 321 and Answer 322 are extracted from transcripts of speaker Agent.

Figure 4:
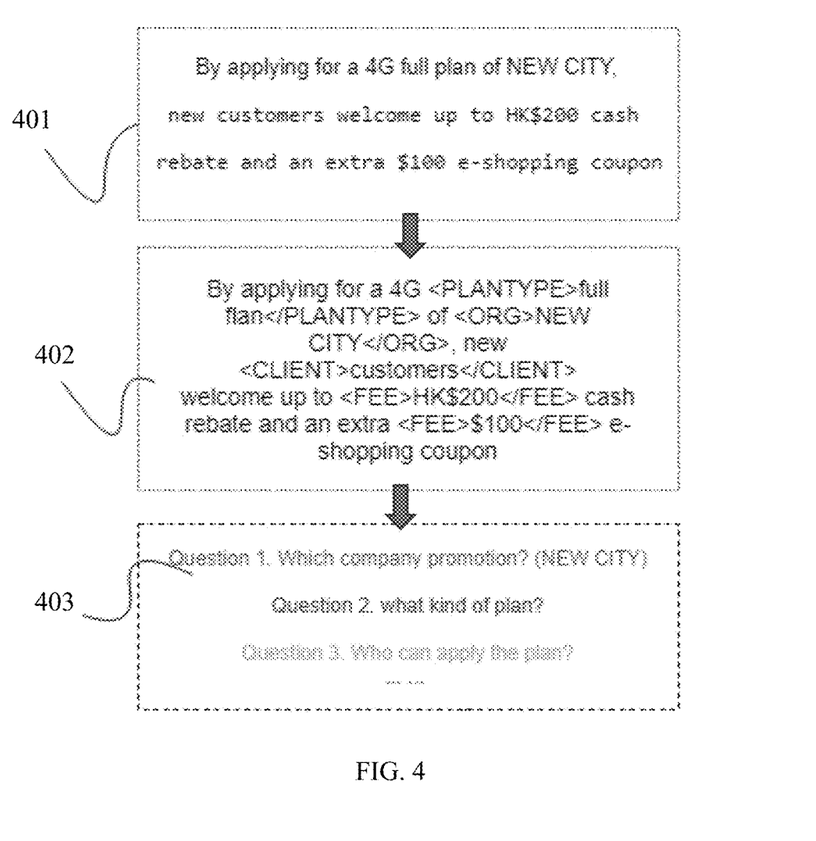
FIG. 4 shows how an article is processed by a conversation parsing module according to one embodiment of the present invention.

FIG. 4 shows how an article is processed by the conversation parsing module 140 according to one embodiment of the present invention. Referring to FIG. 4, an article 401 is applied with a domain-specific language model. Information of interest are identified and labelled with the pre-defined tags (<ORG>, <PLANTYPE>, <FEE>, <CLIENT>) to form a processed article 402. The labelled words in the processed article 402 are extracted to generate 3 pairs of question and answer 403.

The conversation parsing module 140 may be a machine learning module trained with a region-based attention algorithm for extracting the entities of interest across sentences in the transcripts. The region-based attention algorithm may be formulated by defining a region with intra-sentence information and inter-sentence information; and optimizing an objective function based on the defined region.

Figure 5:
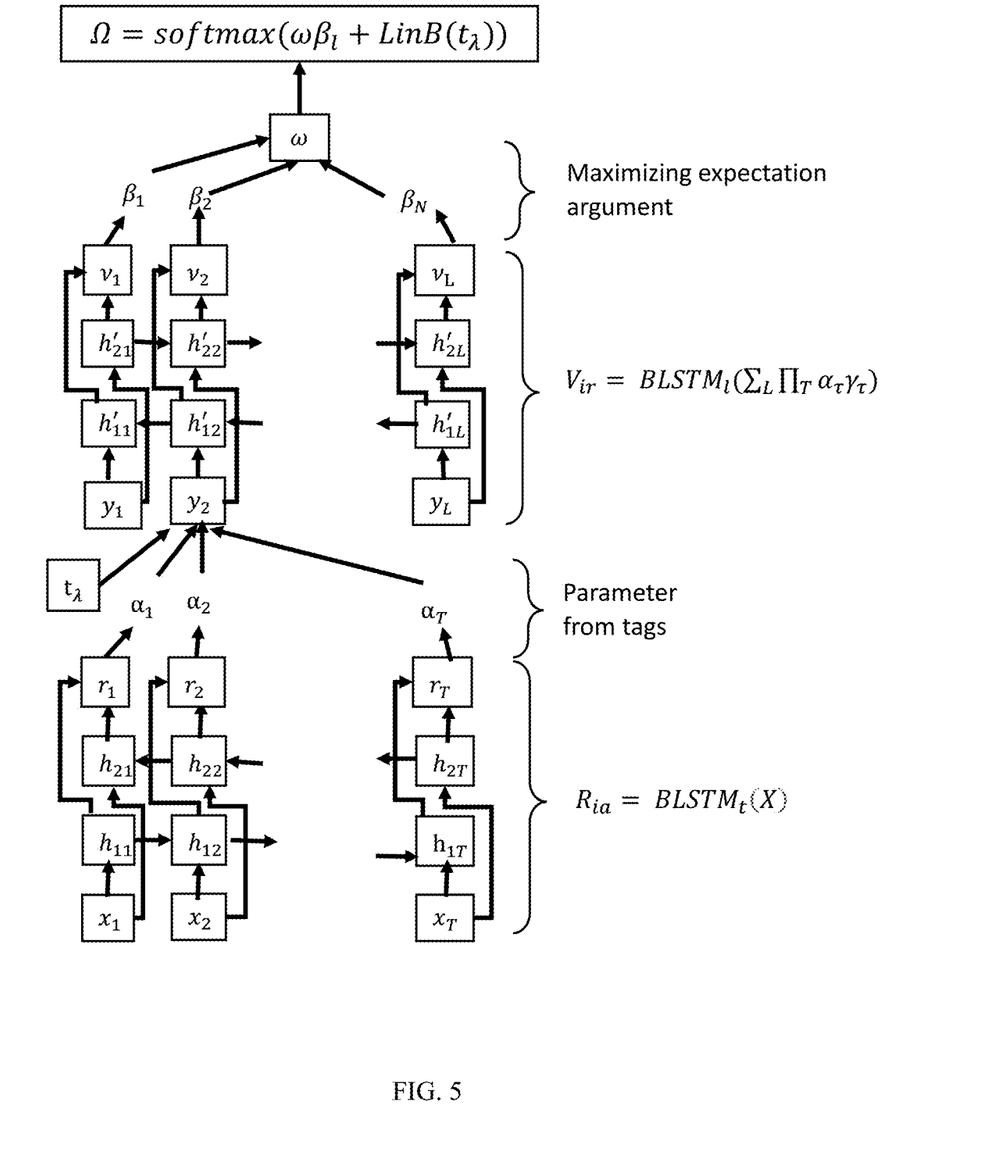
FIG. 5 shows a flowchart for the region-based attention algorithm according to one embodiment of the present invention.

Referring to FIG. 5, which shows a flowchart for the region-based attention algorithm, the intra-sentence information is updated through an intra-sentence attention algorithm given by:

$$R_{ia}=\mathrm{BLSTM}_t(X),$$

where $\mathrm{BLSTM}_t(\ )$ is a bidirectional long short-term memory function for intra-sentence attention and X is an input word vector representing a set of words in the labelled transcripts; and $R_{ia}$ is an intra-sentence attention output vector.

The inter-sentence information is updated through an inter-sentence attention algorithm given by:

$$V_{ir}=\mathrm{BLSTM}_i(\Sigma_L\Pi_T\alpha_T\gamma_T),$$

where $\mathrm{BLSTM}_i(\ )$ is a bidirectional long short-term memory function for inter-sentence attention, $\alpha_\tau$ is a parametric vector from the plurality of pre-defined tags, and $\gamma_\tau$ is an intra-sentence attention output vector, and $V_{ir}$ is an inter-sentence attention output vector.

The objective function is given by:

$$\Omega=\mathrm{softmax}(\omega\beta_I+\mathrm{Lin}B(t_\lambda)),$$

where $\Omega$ is the machine learning objective, $\omega\beta_I$ is maximizing expectation argument, and $\mathrm{Lin}B(t_\lambda)$ is linear biased estimation of a heuristic weighting parameter $t_\lambda$.

Referring back to FIG. 1, the knowledge graph container 150 may be configured for receiving the extracted entities of interest and schema of relations; and constructing or updating a knowledge graph based on the extracted entities of interest and schema of relations.

Figure 6:
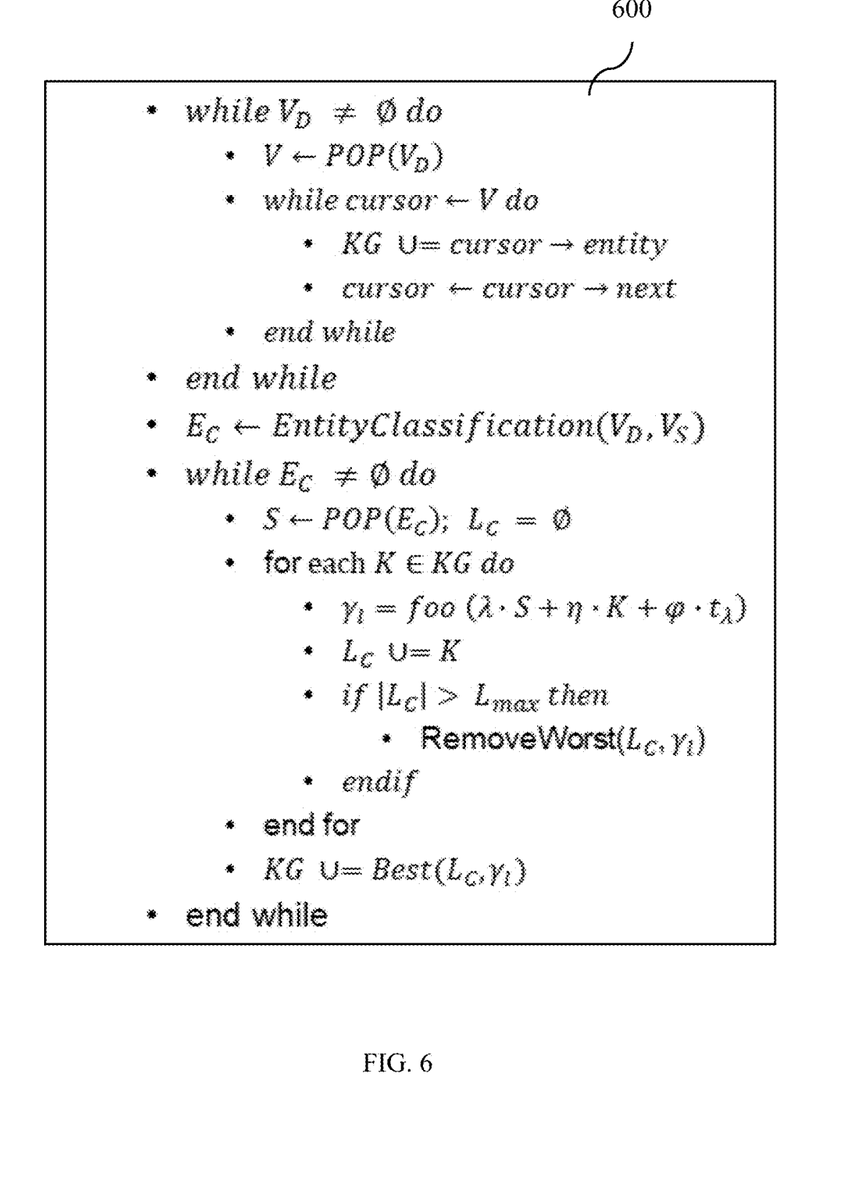
FIG. 6 shows an exemplary algorithm used for constructing or updating the knowledge graph by a knowledge graph container according to one embodiment of the present invention.

FIG. 6 shows an exemplary algorithm 600 used for constructing or updating the knowledge graph by the knowledge graph container 150 according to one embodiment of the present invention. Referring to FIG. 6, the knowledge graph container 150 may be further configured for: applying entity classification on the dynamic information word set $V_D$ and the static information word set $V_S$ to generate one or more classified entities S; calculating a plurality of relation probabilities, $\gamma_l$, for a preset number, $L_{max}$, of the classified entities S with existing entities K in the knowledge graph KG; identifying a set of best candidates of entity from the classified entities; and updating the knowledge graph KG by incorporating set of best candidates of entity into the knowledge graph KG.

The relation probabilities $\gamma_l$ may be given by:

$$\gamma_l = foo(\lambda \cdot S + \eta \cdot K + \varphi \cdot t_\lambda)$$

where $t_\lambda$ is a heuristic weighting parameter, $\lambda$, $\eta$ and $\varphi$ are coefficients for S, K and $t_\lambda$, respectively.

Figure 7:
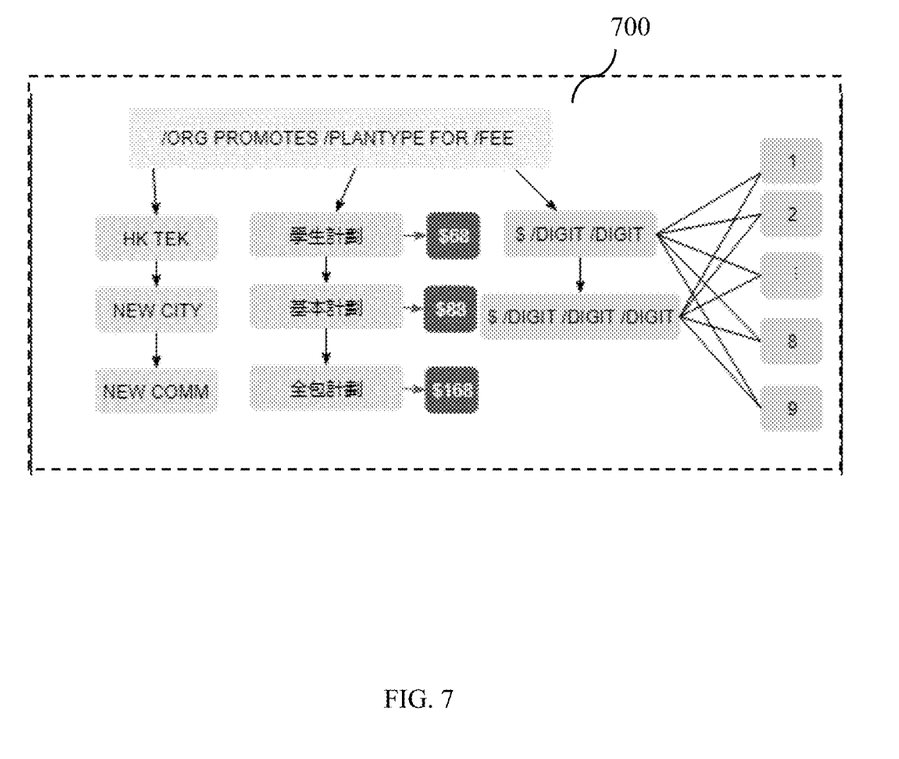
FIG. 7 shows exemplary constructed graphs used for constructing or updating a knowledge graph by a knowledge graph container according to one embodiment of the present invention.

FIG. 7 shows a plurality of exemplary constructed graphs 700 used for constructing or updating the knowledge graph by the knowledge graph container 150 according to one embodiment of the present invention. Referring to FIG. 7, entities of interest may be grouped according to their classification and organized to form the plurality of connected graphs 700 based on some single patterns.

Figure 8:
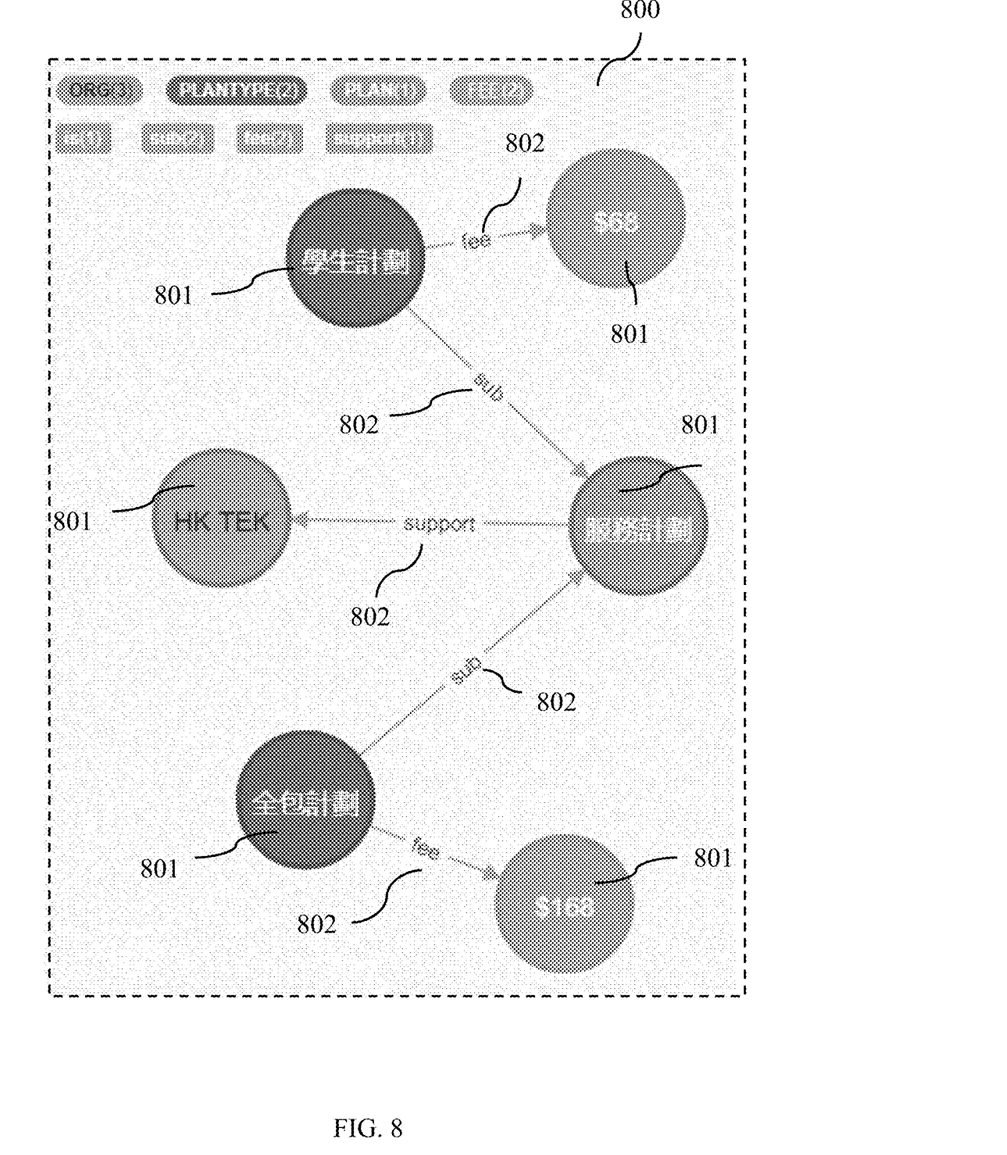
FIG. 8 shows an exemplary knowledge graph according to one embodiment of the present invention.

FIG. 8 shows an exemplary knowledge graph 800 according to one embodiment of the present invention. Referring to FIG. 7, the extracted entities of interest may be represented as nodes 801 and the extracted schema of relations may be represented as labels and edges 802 between nodes 801 in the knowledge graph.

Figure 9:
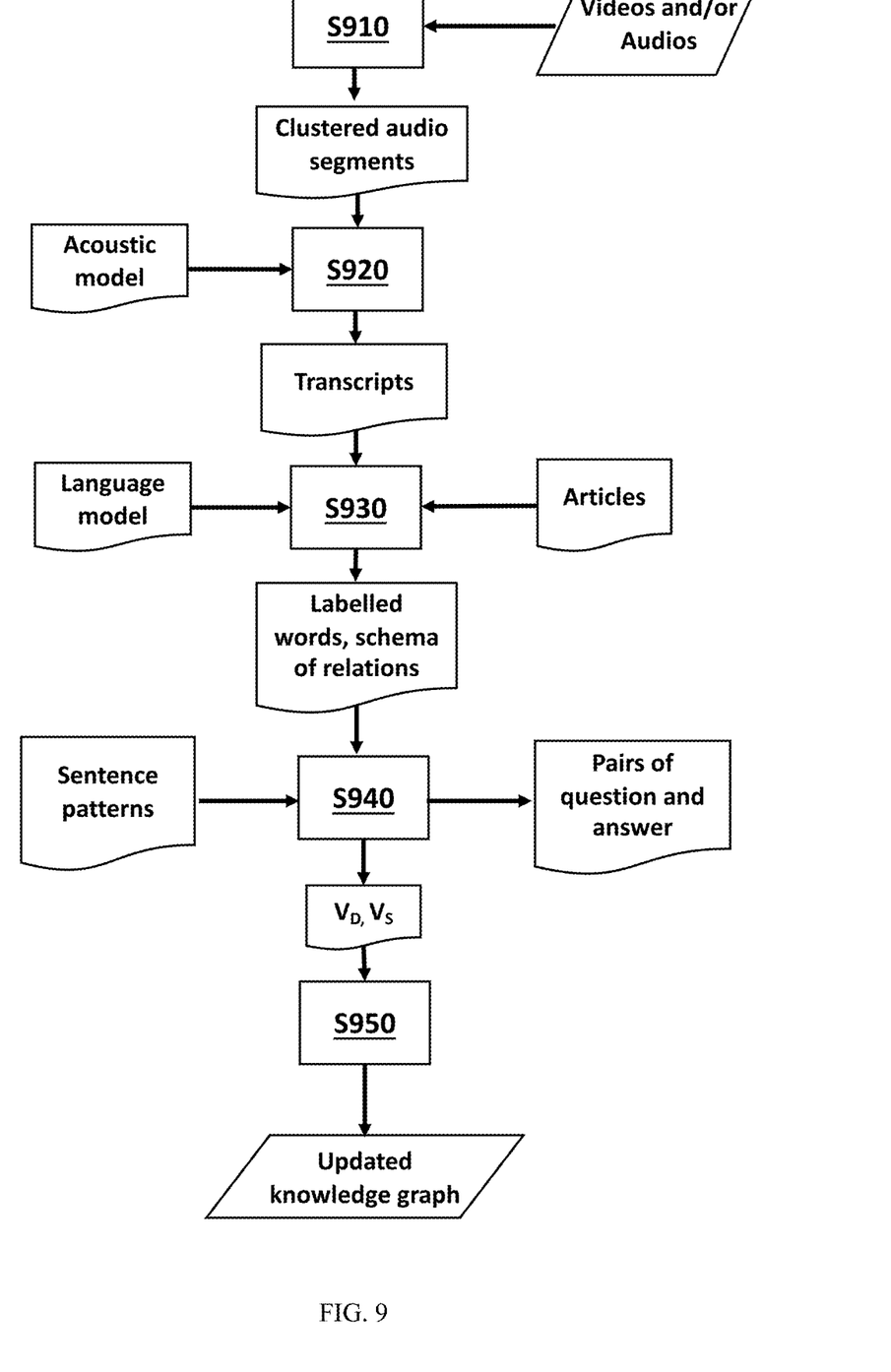
FIG. 9 shows a flowchart of a method for automatic generation and update of a knowledge graph from multi-modal sources according to one embodiment of the present invention.

FIG. 9 shows a flowchart of a method for automatic generation and update of a knowledge graph from multimodal sources according to one embodiment of the present invention. Referring to FIG. 9, the method comprises the following steps:

S910: clustering, by a speaker diarization module, an input audio stream;

S920: transcribing, by an audio transcription module, the clustered audio segments to transcripts based on an acoustic model;

S930: labelling, by a speech parsing module, the transcripts;

S940: generating, by a conversation parsing module, pairs of question and answer; and S950: updating, by a knowledge graph container, a knowledge graph.

Preferably, the step S910 may comprise: partitioning the input audio stream into audio segments; classifying speakers of the audio segments as agent or customer; and clustering the audio segments based on speaker classification.

Preferably, the step S930 may comprise: extracting entities of interest and schema of relations from the transcripts; and labelling words of the transcripts corresponding to the extracted entities of interest with a plurality of pre-defined tags from a domain-specific language model.

Preferably, the step S940 may comprise: updating a dynamic information word set $V_D$ with the labelled words of the transcripts and a static information word set $V_S$ based on the extracted schema of relations from the transcripts; retrieving one or more sentence patterns from the domain-specific language model; and generating the pairs of question and answer based on the dynamic information word set $V_D$, the static information word set $V_S$ and the one or more sentence patterns.

Optionally, the step S930 may further comprise: extracting entities of interest and schema of relations from an article; and labelling words of the article corresponding to the extracted entities of interest with a plurality of pre-defined tags from a domain-specific language model. The step S940 may further comprise: updating the dynamic information word set $V_D$ with the labelled words of the article; and updating the static information word set $V_S$ based on the extracted schema of relations from the article.

Preferably, the step S950 may comprise: receiving the extracted entities of interest and schema of relations; representing, by a knowledge graph container, the extracted entities of interest as nodes in the knowledge graph; and representing, by a knowledge graph container, the extracted schema of relations as labels and edges between nodes in the knowledge graph.

Preferably, the step S950 may further comprise: applying entity classification on the dynamic information word set $V_D$ and the static information word set $V_S$ to generate one or more classified entities; calculating relation probabilities for a preset number of classified entities with existing entities in the knowledge graph; identifying a set of best candidates of entity from the classified entities; and updating the knowledge graph by incorporating set of best candidates of entity into the knowledge graph.

The embodiments disclosed herein may be implemented using one or more computing devices, computer processors, or electronic circuitries including but not limited to application specific integrated circuits (ASIC), field programmable gate arrays (FPGA), and other programmable logic devices specially configured or programmed according to the teachings of the present disclosure. Machine instructions executing in and/or electronic circuitry configurations in the computing devices, computer processors, or programmable logic devices can readily be prepared by practitioners skilled in the computer and electronic art based on the teachings of the present disclosure.

The aforesaid computing devices, computer processors, or electronic circuitries may be incorporated in one or more server computers, personal computers, laptop computers, mobile computing devices such as smartphones and tablet computers.

The electronic embodiments include transient and non-transient electronic storage media having machine instructions and/or electronic circuitry configuration data stored therein which can be used to configured computing devices, computer processors, or electronic circuitries to perform any of the processes of the present invention. The storage media can include, but are not limited to, floppy disks, optical discs, Blu-ray Disc, DVD, CD-ROMs, and magneto-optical disks, ROMs, RAMS, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for automatic generation and update of a knowledge graph from one or more multi-modal sources, the apparatus comprising:
    a speaker diarization module configured for: partitioning an input audio stream into audio segments; classifying speakers of the audio segments as agent or customer; and clustering the audio segments based on speaker classification;
    an audio transcription module configured for transcribing the clustered audio segments to transcripts based on an acoustic model;
    a speech parsing module configured for:
        extracting entities of interest and schema of relations from the transcripts; and
        labelling words of the transcripts corresponding to the extracted entities of interest with a plurality of pre-defined tags from a domain-specific language model;
    a conversation parsing module configured for:
        updating a dynamic information word set $V_D$ with the labelled words of the transcripts;
        updating a static information word set $V_S$ based on the extracted schema of relations from the transcripts;
        retrieving one or more sentence patterns from the domain-specific language model; and
        generating pairs of question and answer based on the dynamic information word set $V_D$, the static information word set $V_S$ and the one or more sentence patterns; and
    a knowledge graph container configured for updating a knowledge graph by:
    receiving the extracted entities of interest and schema of relations;
    representing the extracted entities of interest as nodes in the knowledge graph; and
    representing the extracted schema of relations as labels and edges between nodes in the knowledge graph.

2. The apparatus of claim 1, wherein
    the speech parsing module is further configured for: extracting entities of interest and schema of relations from an article; and labelling words of the article corresponding to the extracted entities of interest with a plurality of pre-defined tags from a domain-specific language model; and
    the conversation parsing module is further configured for: updating the dynamic information word set $V_D$ with the labelled words of the article; and updating the static information word set $V_S$ based on the extracted schema of relations from the article.

3. The apparatus of claim 1, wherein the input audio stream is a soundtrack of a video or audio stream.

4. The apparatus of claim 1, wherein the domain-specific language model is generated by:
    generalizing a table of jargons and corpus with vocabulary lexicon to form a general language model; and
    interpolating the general language model with pre-defined domain-specific knowledge based on a heuristic weighting to generate the domain-specific language model.

5. The apparatus of claim 1, wherein
    the conversation parsing module is a machine learning module trained with a region-based attention algorithm for extracting the entities of interest across sentences in the transcripts;
    the region-based attention algorithm is formulated by defining a region with intra-sentence information and inter-sentence information; and optimizing an objective function based on the defined region.

6. The apparatus of claim 5, wherein the intra-sentence information is updated through an intra-sentence attention algorithm given by:

$$R_{ia}=BLSTM_t(X),$$

wherein $BLSTM_t(\ )$ is a bidirectional long short-term memory function for intra-sentence attention and X is an input word vector representing a set of words in the labelled transcripts; and $R_{ia}$ is an intra-sentence attention output vector.

7. The apparatus of claim 5, wherein the inter-sentence information is updated through an inter-sentence attention algorithm given by:

$$V_{ir}=BLSTM_t(\Sigma_L \Pi_T \alpha_\tau \gamma_\tau)$$

where $BLSTM_t(\ )$ is a bidirectional long short-term memory function for inter-sentence attention, $\alpha_\tau$ is a parametric vector, and $\gamma_\tau$ is an intra-sentence attention output vector, and $V_{ir}$ is an inter-sentence attention output vector.

8. The apparatus of claim 5, wherein the objective function is given by:

$$\Omega=\text{softmax}(\omega\beta_i+\text{LinB}(t_\lambda)),$$

wherein $\Omega$ is the machine learning objective, $\omega\beta_i$ is maximizing expectation argument, and $\text{LinB}(t_\lambda)$ is linear biased estimation of a heuristic weighting parameter $t_\lambda$.

9. The apparatus of claim 1, wherein the knowledge graph container is further configured for:
    applying entity classification on the dynamic information word set $V_D$ and the static information word set $V_S$ to generate one or more classified entities;
    calculating relation probabilities for a preset number of classified entities with existing entities in the knowledge graph;
    identifying a set of best candidates of entity from the classified entities; and
    updating the knowledge graph by incorporating a set of best candidates of entity into the knowledge graph.

10. The apparatus of claim 9, wherein the relation probabilities are given by:

$$\gamma_l = foo(\lambda \cdot S + \eta \cdot K + \varphi \cdot t_\lambda)$$

where $\gamma_l$ is the relation probability, S is a classified entity from the dynamic information word set $V_D$ and the static information word set $V_S$, K is an existing entity in the knowledge graph, $t_\lambda$ is a heuristic weighting parameter, $\lambda$, $\eta$ and $\varphi$ are coefficients for S, K and $t_\lambda$ respectively.

11. A method for automatic generation and update of a knowledge graph from multi-modal sources, the method comprising:
    clustering, by a speaker diarization module, an input audio stream by:
        partitioning the input audio stream into audio segments;
        classifying speakers of the audio segments as agent or customer; and
        clustering the audio segments based on speaker classification;
    transcribing, by an audio transcription module, the clustered audio segments to transcripts based on an acoustic model;
    labelling, by a speech parsing module, the transcripts by:
        extracting entities of interest and schema of relations from the transcripts; and labelling words of the transcripts corresponding to the extracted entities of interest with a plurality of pre-defined tags from a domain-specific language model;

generating, by a conversation parsing module, pairs of question and answer by:
  updating a dynamic information word set $V_D$ with the labelled words of the transcripts and a static information word set $V_S$ based on the extracted schema of relations from the transcripts;
  retrieving one or more sentence patterns from the domain-specific language model; and
  generating the pairs of question and answer based on the dynamic information word set $V_D$, the static information word set $V_S$ and the one or more sentence patterns;

updating, by a knowledge graph container, a knowledge graph by:
  receiving the extracted entities of interest and schema of relations;
  representing, by a knowledge graph container, the extracted entities of interest as nodes in the knowledge graph; and
  representing, by a knowledge graph container, the extracted schema of relations as labels and edges between nodes in the knowledge graph.

12. The method of claim 2, further comprising:
extracting entities of interest and schema of relations from an article;
labelling words of the article corresponding to the extracted entities of interest with a plurality of pre-defined tags from a domain-specific language model;
updating the dynamic information word set $V_D$ with the labelled words of the article; and
updating the static information word set $V_S$ based on the extracted schema of relations from the article.

13. The method of claim 11, wherein the input audio stream is a soundtrack of a video or audio stream.

14. The method of claim 11, wherein the domain-specific language model is generated by:
generalizing a table of jargons and corpus with vocabulary lexicon to form a general language model; and
interpolating the general language model with pre-defined domain-specific knowledge based on a heuristic weighting to generate the domain-specific language model.

15. The method of claim 11, further comprising:
training the conversation parsing module with a region-based attention algorithm for extracting the entities of interest across sentences in the transcripts;

the region-based attention algorithm is formulated by defining a region with intra-sentence information and inter-sentence information; and optimizing an objective function based on the defined region.

16. The method of claim 15, wherein the intra-sentence information is updated through an intra-sentence attention algorithm given by:

$$R_{ia}=\text{BLSTM}_t(X),$$

wherein $\text{BLSTM}_t(\ )$ is a bidirectional long short-term memory function for intra-sentence attention and X is an input word vector representing a set of words in the labelled transcripts; and $R_{ia}$ is an intra-sentence attention output vector.

17. The method of claim 15, wherein the inter-sentence information is updated through an inter-sentence attention algorithm given by:

$$V_{ir}=\text{BLSTM}_i(\Sigma_L \Pi_T \alpha_\tau \gamma_\tau),$$

where $\text{BLSTM}_i(\ )$ is a bidirectional long short-term memory function for inter-sentence attention, $\alpha_\tau$ is a parametric vector, and $\gamma_\tau$ is an intra-sentence attention output vector, and $V_{ir}$ is an inter-sentence attention output vector.

18. The method of claim 15, wherein the objective function is given by:

$$\Omega=\text{softmax}(\omega\beta_I+\text{LinB}(t_\lambda)),$$

wherein $\Omega$ is the machine learning objective, $\omega\beta_I$ is maximizing expectation argument, and $\text{LinB}(t_\lambda)$ is linear biased estimation of a heuristic weighting parameter $t_\lambda$.

19. The method of claim 11, further comprising:
applying entity classification on the dynamic information word set $V_D$ and the static information word set $V_S$ to generate one or more classified entities;
calculating relation probabilities for a preset number of classified entities with existing entities in the knowledge graph;
identifying a set of best candidates of entity from the classified entities; and
updating the knowledge graph by incorporating set of best candidates of entity into the knowledge graph.

20. The method of claim 19, wherein the relation probabilities are given by:

$$\gamma_I=foo(\lambda \cdot S+\eta \cdot K+\varphi \cdot t_\lambda)$$

where $\gamma_I$ is the relation probability, S is a classified entity from the dynamic information word set $V_D$ and the static information word set $V_S$, K is an existing entity in the knowledge graph, $t_\lambda$ is a heuristic weighting parameter, $\lambda$, $\eta$ and $\varphi$ are coefficients for S, K and $t_\lambda$ respectively.

* * * * *